United States Patent
Vandevyver et al.

(10) Patent No.: US 7,674,849 B2
(45) Date of Patent: Mar. 9, 2010

(54) PROCESS FOR THE MANUFACTURE OF A COMPOSITE MATERIAL, COMPOSITE MATERIAL AND USE THEREOF

(75) Inventors: Eric Vandevyver, Brussels (BE); Jean-Marc Coisne, Boignee (BE); Yves Lambert, Wemmel (BE)

(73) Assignee: SOLVAY (Société Anonyme), Brussels (BE)

( * ) Notice: Subject to any disclaimer, the term of this patent is extended or adjusted under 35 U.S.C. 154(b) by 574 days.

(21) Appl. No.: 10/582,956

(22) PCT Filed: Dec. 14, 2004

(86) PCT No.: PCT/EP2004/053436

§ 371 (c)(1),
(2), (4) Date: Dec. 26, 2006

(87) PCT Pub. No.: WO2005/058750

PCT Pub. Date: Jun. 30, 2005

(65) Prior Publication Data

US 2007/0149684 A1      Jun. 28, 2007

Related U.S. Application Data

(60) Provisional application No. 60/534,200, filed on Jan. 2, 2004.

(30) Foreign Application Priority Data

Dec. 16, 2003   (FR) ................................. 03 14766

(51) Int. Cl.
*C08K 9/04* (2006.01)
*C08J 3/00* (2006.01)

(52) U.S. Cl. ...................................... 524/445; 523/340

(58) Field of Classification Search .................. 524/445
See application file for complete search history.

(56) References Cited

U.S. PATENT DOCUMENTS

| 4,638,029 A * | 1/1987 | Meschke et al. ............ 524/430 |
| 5,702,131 A * | 12/1997 | Kieffer ..................... 285/139.3 |
| 5,883,173 A * | 3/1999 | Elspass et al. .............. 524/446 |
| 6,057,396 A | 5/2000 | Lan et al. |
| 6,271,297 B1 | 8/2001 | Ishida |
| 7,014,068 B1 * | 3/2006 | Cohen et al. ............. 222/321.9 |
| 7,485,401 B2 * | 2/2009 | Matsumura et al. ...... 430/109.4 |
| 2004/0054059 A1 * | 3/2004 | Parker et al. ................ 524/445 |

FOREIGN PATENT DOCUMENTS

| KR | 2002 029 157 | 4/2002 |
| KR | 2002 050 493 | 6/2002 |
| KR | 2002 051 203 | 6/2002 |
| WO | WO 00/58389 | 10/2000 |
| WO | 00 78540 | 12/2000 |

OTHER PUBLICATIONS

Kim, Jin-tae et al.,"Curing and Barrier Properties of NBR/Organo-Clay Nanocomposite", Polymer International, vol. 53, No. 4, pp. 406-411, 2004.
Aguilar-Solis Carlos et al.,"PVC Nanocomposites Via Emulsion and Suspension Polymerization", Polymer Preprints, vol. 43(2), pp. 1019-1020, 2002.

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

Process for the manufacture of a composite material (M) comprising a stage (E) according to which a dispersion (D) comprising : (a) at least one polymer, (b) at least one lamellar compound, and (c) at least one dispersing liquid, is dried by atomization. Composite material (M') comprising (a') at least one polymer, (b') at least one lamellar compound, and (d') at least 0.02% by weight of at least one surface-active agent with respect to the weight of (a') in the dry state; composed of particles having a weight-average diameter D50 of less than or equal to 200 μm. Method for processing this composite material.

20 Claims, 6 Drawing Sheets

PROCESS FOR THE MANUFACTURE OF A COMPOSITE MATERIAL, COMPOSITE MATERIAL AND USE THEREOF

This application is a 371 of PCT/EP04/53436 filed Dec. 14, 2004.

The present application claims the benefit of U.S. provisional application 60/534,200 filed Jan. 2, 2004.

The present invention relates to a process for the manufacture of a composite material, to the composite material and to the use thereof.

In recent years, much research effort has been invested in the development of composite materials, in particular of nanocomposites, that is to say of polymers reinforced with a filler of nanoscopic size (that is to say, at least one of the characteristic dimensions of which is of the order of a nanometer, indeed even of tens of nanometers). Such composites find their application in various fields, such as the motor vehicle industry and packaging. They exhibit noteworthy properties, such as flame retardancy, due to the size and to the high anisotropy of the nanoscopic fillers.

Such fillers are potentially available (that is to say, available with appropriate treatment) in nature in the form of lamellar compounds, such as lamellar clays. The characteristic dimension of the clays is their thickness, with a dimension of 1 to 100 nm, provided that they can be isolated from the aggregates which they naturally form and which are larger in size. However, it is advisable to be able to insert polymer chains between the clay platelets and in addition, preferably, to exfoliate the clay (that is to say, to separate its platelets) in order for it to be able to actually be dispersed in the polymer on the nanoscopic scale. In point of fact, clays are hydrophilic substances whereas the majority of polymers are hydrophobic substances. Thus, to ensure that polymer molecules penetrate into the lamellar structure of the clay and break it up generally requires a modification to the clay in order to render it more organophilic.

Thus, processes have already been provided which make possible either the modification of the clay with appropriate compounds (for example organic surfactants of ammonium or phosphonium type, silanes, and the like) prior to its incorporation into a polymer matrix, for example during a processing operation where the polymer is brought to a temperature greater than or equal to its melting point or gelling temperature, or the in situ modification of the clay by at least one appropriate substance, such as a swelling agent. Other processes, such as those involving the polymerization of certain monomers in situ in the modified clay or the direct incorporation of polymers in solution between the clay platelets subsequent to ion exchange phenomena, have also been provided. These processes nevertheless exhibit the disadvantage of involving a stage of pretreatment of the clay with agents which are expensive and/or specific to a given polymer.

Thus, Patent Application WO 00/78540 discloses the use of clays modified by a surfactant (salt of "onium" type) for the manufacture of nanocomposites using processes in an extruder or in solution in solvents. However, this technique is limited to polymers which are readily inserted into the lamellar structure of the clay. In addition, it requires recourse to a separate stage of treatment with specific surfactants which, furthermore, are used in large amounts.

With regard to U.S. Pat. Nos. 6,057,396 and 6,271,297, they disclose a process which consists in swelling the clay using a swelling agent which preferably comprises a monomer capable of polymerizing in situ between the platelets of the clay during a "reactive" extrusion. This process is therefore not applicable to the manufacture of any type of composite material since the polymer which has polymerized in situ must be identical to or compatible with that of the matrix of the nanocomposite.

Aguilar-Solis C., Xu Y. and Brittain W. J. (Polymer Preprints, 2002, 43(2), 1019-20) have, for their part, provided for the blending of a latex of a vinyl chloride homopolymer, prepared in aqueous emulsion, with an aqueous dispersion of unmodified clay. The blending is then followed by a coagulation stage, from which a nanocomposite results. The process thus disclosed exhibits the disadvantage of being a process which is difficult to employ and which results in composite materials having a morphology (size and shape of the grains) inappropriate for processing by extrusion and for the manufacture of pastes (plastisols).

An object of the present invention is thus to provide a process which makes it possible to obtain composite materials without having to modify the clay beforehand, in particular by expensive agents, which is not limited in the choice of the polymer, which results in composite materials having a morphology suitable for processing by extrusion and for the manufacture of pastes, and which exhibits all the advantages of the processes of the prior art without exhibiting the disadvantages thereof.

The present invention consequently relates to a process for the manufacture of a composite material (M) comprising a stage (E) according to which a dispersion (D) comprising:
(a) at least one polymer,
(b) at least one lamellar compound, and
(c) at least one dispersing liquid, is dried by atomization.

The term "drying by atomization" is intended to denote, for the purposes of the present invention, the drying of a dispersion as fine droplets of the product to be dried.

Any gas can be used for the drying by atomization. Air, nitrogen and any other inert gas are examples thereof Preferably, the drying by atomization is carried out by means of air, in a particularly preferred way by means of compressed air.

The temperature of the incoming air used for the drying is advantageously greater than or equal to 100° C., preferably greater than or equal to 140° C. and particularly preferably greater than or equal to 170° C. The temperature of the incoming air used for the drying is advantageously less than or equal to 250° C., preferably less than or equal to 210° C. and particularly preferably less than or equal to 200° C.

The temperature of the air exiting from the drying is advantageously controlled. This temperature is preferably greater than or equal to 40° C., particularly preferably greater than or equal to 55° C. and very particularly preferably greater than or equal to 70° C. The temperature of the exiting air is preferably less than or equal to 100° C., particularly preferably less than or equal to 90° C. and very particularly preferably less than or equal to 80° C.

The drying by atomization can in particular be of three types, turbine atomization, atomization by means of compressed air through two-fluid nozzles and atomization by compression-pressure reduction by means of nozzles with a fluid. The term "drying by turbine atomization" is understood to mean drying where the aqueous dispersion exits rapidly from the turbine after distribution in a channelled disc rotating at high speed. Thus, the resulting and high forces of friction with the drying air result in the formation of particle sizes with a mean diameter generally of between 15 and 70 µm. The term "drying by atomization by means of compressed air through two-fluid nozzles" is understood to mean drying where the compressed air moves tangentially in the outer casing of a two-fluid nozzle comprising two concentric parts, whereas the aqueous dispersion is entrained under low pressure in the central pipe. Thus, the suction by the compressed air at the outlet of the pipe produces high frictional forces which give rise to the formation of particle sizes with a mean diameter generally of between 20 and 40 µm. The term "drying by atomization by compression-pressure reduction by means of nozzles with a fluid" is understood to mean drying where the polymer dispersion, compressed beforehand by a pump, is reduced in pressure at the outlet of a nozzle with a fluid, resulting in a product with a bigger particle size with a mean diameter generally of between 80 and 150 µm. The drying by atomization is preferably drying by turbine atomization.

The term "at least one polymer" is intended to denote that the dispersion (D) comprises one or more polymers.

The polymers can have any chemical nature. The polymers are preferably polymers of one or more ethylenically unsaturated monomers. The term "polymers of one or more ethylenically unsaturated monomers" is understood to mean both homopolymers of ethylenically unsaturated monomers and the copolymers which these monomers form with other ethylenically unsaturated monomers.

Mention may be made, as examples of such polymers, of halogenated polymers, polymers of acrylic acid or of its esters, polymers of methacrylic acid or of its esters, polymers of acrylonitrile or of methacrylonitrile, polymers of acrylamide, of methacrylamide or of their derivatives, polymers of vinyl acetate, polymers of ethylene (optionally chlorinated ethylene), of propylene, of butadiene, of isoprene, of styrene and of its derivatives; polyamides and polyesters.

Preferably, the dispersion comprises at least one polymer which is a halogenated polymer.

The term "halogenated polymer" is intended to denote both homopolymers of ethylenically unsaturated halogenated monomers and the copolymers which the latter form with themselves and/or with at least one ethylenically unsaturated nonhalogenated monomer. In other words, the halogenated polymer advantageously comprises at least 50%, preferably at least 60%, particularly preferably at least 70%, by weight of monomer units derived from an ethylenically unsaturated halogenated monomer.

The halogenated polymer is preferably chosen from fluoropolymers and chloropolymers.

The term "fluoropolymers" is intended to denote homopolymers of fluorinated monomers and the copolymers which the latter form with at least one other halogenated monomer and/or another ethylenically unsaturated nonhalogenated monomer, such as ethylene, vinyl acetate and acrylic or methacrylic monomers. The term "fluorinated monomers" is intended to denote ethylenically unsaturated fluorinated monomers which are aliphatic and which have, as sole heteroatom(s), one or more fluorine atoms and optionally, in addition, one or more chlorine atoms. Mention may be made, as examples of fluorinated monomers, of chlorotrifluoroethylene, trifluoroethylene, perfluorinated monomers, such as tetrafluoroethylene and hexafluoropropylene, fluorinated monomers which are devoid of chlorine atoms and which have 1 fluorine atom, such as allyl fluoride and vinyl fluoride, and fluorinated monomers which are devoid of chlorine atoms and which have 2 fluorine atoms, such as vinylidene fluoride.

Particular preference is granted to vinylidene fluoride polymers. The term "vinylidene fluoride polymer" is intended to denote, for the purposes of the present invention, any polymer comprising at least approximately 50% by weight of monomer units derived from vinylidene fluoride, thus both vinylidene fluoride homopolymers and copolymers of vinylidene fluoride with one or more ethylenically unsaturated and advantageously fluorinated monomers. Mention may be made, as examples of other fluorinated monomers which can be used, of vinyl fluoride, trifluoroethylene, chlorotrifluoroethylene, tetrafluoroethylene and hexafluoropropylene.

The term "chloropolymers" is intended to denote homopolymers of chlorinated monomers and the copolymers which the latter form with at least one other halogenated monomer or with another ethylenically unsaturated nonhalogenated monomer, such as vinyl esters, acrylic or methacrylic monomers, styrene monomers and olefinic monomers. The chloropolymer advantageously comprises at least 50%, preferably at least 60%, particularly preferably at least 70%, by weight of monomer units derived from a chlorinated monomer.

The term "chlorinated monomers" is intended to denote ethylenically unsaturated chlorinated monomers which are aliphatic and which have, as sole heteroatom(s), one or more chlorine atoms. Mention may be made, as examples of chlorinated monomers, of chlorinated monomers having 1 chlorine atom (such as allyl chloride, crotyl chloride and vinyl chloride), chlorinated monomers having 2 chlorine atoms (such as 1,1-dichloropropene, 1,3-dichloropropene, 2,3-dichloropropene and vinylidene chloride), trichloroethylene, 1,1,3-trichloropropene and tetrachloroethylene.

Particular preference is granted to vinyl chloride polymers. The term "vinyl chloride polymer" is intended to denote, for the purposes of the present invention, any polymer comprising at least approximately 50% by weight, preferably at least 60% by weight, particularly preferably at least 70% by weight, of monomer units and very particularly preferably at least 85% by weight of monomer units derived from vinyl chloride, thus both vinyl chloride homopolymers and copolymers of vinyl chloride with one or more ethylenically unsaturated monomers. Mention may be made, as examples of ethylenically unsaturated monomers which can be copolymerized with vinyl chloride, of fluorinated monomers, such as vinylidene fluoride, vinyl esters, such as vinyl acetate, acrylic monomers, such as n-butyl acrylate, styrene monomers, such as styrene, or olefinic monomers, such as ethylene, propylene and butadiene.

The halogenated polymer is particularly preferably a chloropolymer. Excellent results have been obtained with vinyl chloride homopolymers.

According to a preferred alternative form of the process according to the invention, the dispersion comprises only a single polymer. This polymer is preferably a halogenated polymer, particularly preferably a chloropolymer, very particularly preferably a vinyl chloride polymer and really very particularly preferably a vinyl chloride homopolymer.

The amount of polymer in the dispersion (D), expressed as % by weight of polymer with respect to the weight of the dispersion (D), can take any value. The amount of polymer is preferably between 8 and 70%.

The polymers can be obtained by any polymerization process. The polymers are preferably obtained by a radical addition polymerization process. Mention may be made, as examples of radical addition polymerization processes, of aqueous suspension, solution, aqueous microsuspension, aqueous emulsion and bulk polymerization processes. In the specific case where the dispersion comprises at least one polymer which is a halogenated polymer, preferably a vinyl chloride polymer (with a very particular preference for vinyl chloride homopolymers), the latter is preferably obtained by a polymerization process chosen from the aqueous microsuspension polymerization process and the aqueous emulsion polymerization process.

The term "aqueous emulsion radical polymerization" is intended to denote, for the purposes of the present invention, any radical polymerization process which is carried out in an aqueous medium in the presence of water-soluble radical initiators and emulsifiers.

The term "aqueous microsuspension radical polymerization", also known as homogenized aqueous dispersion radical polymerization, is intended to denote, for the purposes of the present invention, any radical polymerization process which is carried out in an aqueous medium in the presence of oil-soluble initiators and emulsifiers and in which an emulsion of droplets of monomers is produced by virtue of powerful mechanical stirring.

The term "at least one lamellar compound" is intended to denote that the dispersion (D) comprises one or more lamellar compounds.

The lamellar compounds can be inorganic compounds or organic/inorganic hybrids. The lamellar compounds are preferably natural or synthetic lamellar clays. Mention may be made, as examples of lamellar clays, of vermiculites, sericites, halloysites, kaolinites, micas, smectites, hydrotalcites and Laponite® synthetic clays. The lamellar compounds are particularly preferably chosen from smectites, hydrotalcites and Laponite® (synthetic layered silicates) clays. The lamellar compounds are very particularly preferably chosen from smectites and Laponite® clays. Mention may be made, as examples of smectites, of montmorillonites, bentonites, saponites, beidellites, nontronites, hectorites, stevensites and sauconites. Montmorillonites and bentonites are preferred among the smectites, with very particular preference for montmorillonites. Mention may be made, as examples of montmorillonites, of montmorillonites such as sodium montmorillonites, sodium/calcium montmorillonites or organically modified montmorillonites, for example modified by quaternary alkyl ammoniums. Good results have been obtained with a sodium montmorillonite.

Preferably, the dispersion comprises at least one lamellar compound which is chosen from smectites and Laponite® clays.

According to the preferred alternative form of the process according to the invention, the dispersion comprises only a single lamellar compound. The latter is preferably chosen from smectites, with preference for montmorillonites and particular preference for sodium montmorillonites, and Laponite® clays.

The amount of lamellar compound in the dispersion (D), expressed as % by weight of lamellar compound in the dry state with respect to the weight of polymer in the dry state, can have any value. The amount of lamellar compound is preferably between 0.001 and 20%, particularly preferably between 0.01 and 10% and very particularly preferably between 0.5 and 6%.

The term "at least one dispersing liquid" is intended to denote that the dispersion (D) comprises one or more dispersing liquids.

The dispersing liquids can have any chemical nature. The dispersing liquids are preferably polar chemical compounds. Mention may be made, as examples of polar chemical compounds, of amides, such as dimethylformamide, alcohols, such as ethanol, ethers, such as diethyl ether, and water. Preferably, the dispersion comprises at least water as dispersing liquid. According to the preferred alternative form of the process according to the invention, the dispersion comprises only a single dispersing liquid. The latter is preferably water.

The amount of dispersing liquid in the dispersion (D), expressed as % by weight of dispersing liquid with respect to the weight of the dispersion (D), can have any value. The amount of dispersing liquid is preferably between 30 and 90%, particularly preferably between 40 and 80% and very particularly preferably between 50 and 70%.

The dispersion (D) in addition advantageously comprises (d) at least one surface-active agent.

The term "at least one surface-active agent" is intended to denote that the dispersion (D) comprises one or more surface-active agents.

The surface-active agents are advantageously dispersants or emulsifiers. Mention made be made, as examples of dispersants, of polyvinyl alcohol, gelatin or methylcellulose. Mention may be made, as examples of emulsifiers, of nonionic emulsifiers, such as ethoxylated alkylphenols, or anionic emulsifiers. The surface-active agents are preferably anionic emulsifiers. Mention may be made, as examples of anionic emulsifiers, of alkyl carboxylate salts, alkyl sulphonate salts, arylalkyl sulphonate salts, alkyl sulphate salts or fatty acid salts. The surface-active agents are particularly preferably arylalkyl sulphonate salts, alkyl sulphate salts or fatty acid salts. Mention may be made, as example of arylalkyl sulphonate salts, of sodium dodecylbenzenesulphonate. Mention may be made, as example of alkyl sulphate salts, of sodium lauryl sulphate. Mention may be made, as example of fatty acid salts, of ammonium myristate. Very particularly preferably, the surface-active agents are sodium dodecylbenzene-sulphonate, sodium lauryl sulphate or ammonium myristate.

The amount of surface-active agent in the dispersion (D), expressed as % by weight of surface-active agent with respect to the weight of the polymer in the dry state, can have any value. The amount of surface-active agent, expressed as % by weight of surface-active agent with respect to the weight of the polymer in the dry state, is preferably greater than 0.02%, particularly preferably greater than or equal to 0.2% and very particularly preferably greater than or equal to 0.5%. The amount of surface-active agent in the dispersion (D), expressed as % by weight of surface-active agent with respect to the weight of the polymer in the dry state, is preferably less than or equal to 4%, particularly preferably less than or equal to 2% and very particularly preferably less than or equal to 1.5%.

The process advantageously comprises a stage (E') of preparation of the dispersion (D), prior to stage (E). The dispersion (D) is preferably prepared:

- by blending a dispersion (A) comprising at least (a) with (b), or
- by blending a dispersion (A) comprising at least (a) with a dispersion (B) comprising at least (b), or
- by polymerization in (c) of at least one monomer to give (a) a polymer in the presence of (b) and, if appropriate, of (d).

The dispersion (D) is prepared, in a particularly preferred way:

- by blending a dispersion (A) comprising (a), (c) and, if appropriate, (d) with (b), or by blending a dispersion (A) comprising (a), a portion of (c) and, if appropriate, (d) with a dispersion (B) comprising (b) and the balance of (c).

The dispersion (D) is prepared in a very particularly preferred way by blending a dispersion (A) comprising (a), a portion of (c) and, if appropriate, (d) with a dispersion (B) comprising (b) and the balance of (c).

It may be advantageous to add a peptizing agent to the dispersion according to the invention. Thus, according to a preferred form of the process according to the invention, the dispersion additionally comprises (e) at least one peptizing agent.

The term "peptizing agent" is intended to denote, for the purposes of the present invention, a compound which encourages the formation of a colloidal dispersion of the lamellar compound and which reduces the viscosity thereof by inhibiting the electrostatic interactions between the platelets of the lamellar compound.

The peptizing agent can be chosen from alkali metal phosphates and alkali metal polyphosphates.

Mention may be made, among alkali metal phosphates, of monosodium phosphate ($NaH_2PO_4$), disodium phosphate ($Na2HPO_4$), trisodium phosphate ($Na_3PO_4$) and their potassium equivalents, in the crystalline or anhydrous form.

Mention may be made, among alkali metal polyphosphates, of alkali metal pyrophosphates, alkali metal tripolyphosphates and alkali metal tetrapolyphosphates.

Mention may be made, among alkali metal pyrophosphates, of crystalline tetrasodium pyrophosphate ($Na_4P_2O_7 \cdot 10H_2O$), anhydrous tetrasodium pyrophosphate ($Na_4P_2O_7$), sodium pyrophosphate ($Na_2H_2P_2O_7$) and their potassium equivalents, in the crystalline or anhydrous form.

Mention may be made, among alkali metal tripolyphosphates, of pentasodium tripolyphosphate ($Na_5P_3O_{10}$) and its potassium equivalent, in the crystalline or anhydrous form.

Mention may be made, among alkali metal tetrapolyphosphates, of hexasodium tetrapolyphosphate ($Na_6P_4O_{13}$) and its potassium equivalent, in the crystalline or anhydrous form.

The peptizing agent is preferably chosen from alkali metal polyphosphates, particularly preferably from alkali metal pyrophosphates and very particularly preferably from anhydrous tetrasodium pyrophosphate and crystalline tetrasodium pyrophosphate.

The amount of peptizing agent in the dispersion (D), expressed as % by weight of anhydrous peptizing agent with respect to the weight of the lamellar compound in the dry state, is advantageously between 0.1 and 15, preferably between 0.2 and 10 and particularly preferably between 0.3 and 9.

The peptizing agent (e) can be added according to any method. According to a first alternative form, it is added in the solid state to the lamellar compound (b), itself in the solid state, prior to stage (E'). According to a second preferred alternative form, it is added in the solid state to the mixture of the dispersion (A) comprising at least (a) with (b) produced during stage (E'). According to a third preferred alternative form, it is added in the solid state to the dispersion (B) comprising at least (b) prior to stage (E'). According to a fourth preferred alternative form, the lamellar compound (b) in the solid state is added to a dispersion of the peptizing agent (e) in the dispersing liquid (c) to constitute the dispersion (B). The first, second and third alternative forms are particularly preferred. The first alternative form is very particularly preferred.

According to the preferred form of the process according to the invention, the preparation of the dispersion (D) by blending a dispersion (A) comprising (a), a portion of (c) and, if appropriate, (d) with a dispersion (B) comprising (b), mixed beforehand in the solid state with the peptizing agent (e), itself also in the solid state, and the balance of (c) gives good results.

The process advantageously comprises at least one stage (E"), subsequent to stage (E), according to which the composite material is treated so as to adjust the morphology thereof. The morphology of the composite material is defined by the weight-average diameter D50 and/or the average aspect ratio of the particles of the material. The terms "weight-average diameter D50" and "average aspect ratio" are defined in the descriptive part of the examples.

The morphology of the composite material can be adjusted without limitation by milling, classification or milling followed by classification.

Subsequently, another subject-matter of the invention is a composite material which exhibits numerous advantages with respect to the composite materials of the prior art without exhibiting the disadvantages thereof.

To this end, the subject-matter of the invention also relates to a composite material (M') comprising:
(a') at least one polymer,
(b') at least one lamellar compound, and
(d') at least 0.02% by weight of at least one surface-active agent with respect to the weight of (a') in the dry state; composed of particles having a weight-average diameter D50 of less than or equal to 200 µm.

The composite material according to the invention is preferably in the powder form.

The composite material according to the invention is therefore composed of particles having a weight-average diameter D50 of less than or equal to 200 µm, preferably of less than or equal to 150 µm, particularly preferably of less than or equal to 100 µm and very particularly preferably of less than or equal to 50 µm.

The composite material according to the invention is advantageously 35 composed of particles having a weight-average diameter D50 of greater than or equal to 2 µm, preferably of greater than or equal to 5 µm, particularly preferably of greater than or equal to 10 µm and very particularly preferably of greater than or equal to 20 µm.

The polymer (a') corresponds to the same characteristics as the polymer (a), no matter what the level of preference.

The lamellar compound (b') corresponds to the same characteristics as the lamellar compound (b), no matter what the level of preference.

The surface-active agent (d') corresponds to the same characteristics as the surface-active agent (d), no matter what the level of preference.

The composite material according to the invention preferably additionally comprises (e') at least one peptizing agent. The peptizing agent (e') corresponds to the same characteristics as the peptizing agent (e), no what the level of preference.

The amount of surface-active agent in the composite material according to the invention, expressed as % by weight of surface-active agent with respect to the weight of polymer in the dry state, is greater than or equal to 0.02%, preferably greater than or equal to 0.2% and particularly preferably greater than or equal to 0.5%. The amount of surface-active agent in the composite material, expressed as % by weight of surface-active agent with respect to the weight of polymer in the dry state, is preferably less than or equal to 4%, particularly preferably less than or equal to 2% and very particularly preferably less than or equal to 1.5%.

The proportions of the other ingredients of the composite material according to the invention are identical and correspond to the same characteristics as the ingredients of the dispersion (D) employed in the process according to the invention, no matter what the level of preference.

The composite material according to the invention can have any type of structure. The structure of the said material is preferably an intercalated structure or an exfoliated structure, particularly preferably an exfoliated structure. The term "intercalated structure" is understood to mean a structure where the polymer or polymers are located in an ordered way between the layers of lamellar compounds with an increased and repeated distance of a few nanometers between the layers, whereas the term "exfoliated structure" is understood to mean a structure where the layer or layers of lamellar compounds are dispersed randomly throughout the polymer or blend of polymers and which is characterized by the absence of an X-ray diffraction peak characteristic of the lamellar compound or compounds.

The composite material according to the invention is advantageously composed of particles having an average aspect ratio of less than or equal to 4, preferably of less than or equal to 3 and particularly preferably of less than or equal to 1.5.

The composite material according to the invention is advantageously obtained by the process according to the invention.

The subject-matter of the invention is also a method for processing the composite material according to the invention, comprising a stage (E''') according to which a plastisol is prepared. The term "plastisol" is understood to mean a colloidal suspension of at least one polymer in at least one plasticizer, a suspension which is relatively stable over time and the main characteristic of which is the rheological behaviour.

The subject-matter of the invention is finally a method for processing the composite material, comprising a stage (E'''') according to which the polymer of the material is brought to a temperature greater than or equal to its melting point or gelling temperature.

The composite material according to the processing method comprising a stage (E'''') is advantageously blended with at least one additive.

The additives can have any chemical nature. Mention may be made, as examples of additives, of stabilizers, lubricants, processing aids, fillers, stiffness modifiers, pigments and plasticizers.

The present invention provides a process which makes it possible to easily obtain a composite material with an exfoliated structure without exhibiting the disadvantages of stages of pretreatment of the clay with expensive agents and/or agents which are specific to a given polymer. The addition of a peptizing agent to the dispersion according to the invention advantageously improves the conditions for drying the dispersion by virtue of the low viscosity of the latter, without, however, damaging the viscosity of the plastisols formed. This alternative form of the invention makes it possible, when extrapolated to a large scale, to carry out longer drying operations before envisaging cleaning the plant.

The present invention also makes it possible to obtain composite materials exhibiting advantageous characteristics, such as a better morphology (size of the particles, aspect ratio) but also a better flow (flowability).

The present invention also makes it possible to prepare, from the said materials, articles exhibiting a better stiffness, the articles increasing in stiffness as the molecular mass of the polymer decreases. Finally, the present invention makes it possible to prepare, from the said materials, plastisols exhibiting advantageous viscosity properties, such as a higher viscosity at low shear rate.

The examples which follow serve to illustrate the present invention without, however, limiting the scope thereof.

The analyses and determinations used in the examples which follow were carried out as explained below.

Determination of the Weight-average Diameter D50

The weight-average diameter D50 was calculated by linear interpolation of the results of material retained on a sieve measured according to Standard ISO 1624 and corresponds to the sieve size which would bring about a level of material retained of 50% by weight of the powder examined. The sieves used had mesh sizes of 20, 32, 45, 63, 90, 100, 125, 150 and 250 µm. The materials retained were dried directly on the sieves.

Determination of the Average Aspect Ratio

The average aspect ratio is defined by the formula:

$$\overline{F} = \frac{\sum_{i=1}^{n} Fi}{n}$$

in which Fi is the aspect ratio of the particle i, that is to say the ratio of the greatest dimension to the smallest dimension of the particle i, and n is the number of particles i. The greatest dimension and the smallest dimension of each particle i were measured on the image obtained by electron microscopy using a Leo® DSM982 scanning microscope at a magnification of 600×.

Analysis by Optical Microscopy

Microtomic sections (thickness 15 µm) were prepared using a Leitz® sliding microtome. Analysis by optical microscopy was carried out at a magnification ranging from 120× to 240×, in polarized/analysed light, using a Polyvar® microscope from Reichert.

Analysis by Electron Microscopy

Microtomic sections (thickness 15 µm) were prepared using a Supernova® device from Reichert.

Examination by electron microscopy was carried out at magnifications ranging from 10 000× to 100 000× using an Elmiskop® 102 device from Siemens.

Determination of the K-value

The K-value was measured according to Standard ISO 1628/2.

Determination of the Stiffness

DMTS stiffness, that is to say the storage modulus in MPa as a function of temperature in degrees Celsius, was measured using a Gabo® DMTS device, Eplexor® 500N model, according to a tensile stress mode, at a frequency of 20 Hz, between 20 and 150° C., with a temperature slope of 2° C. per minute.

Determination of the Impact Strength

The tensile-impact strength in joules (J) was measured at ambient temperature according to Standard ISO 8256.

Determination of the Viscosity of the Montmorillonite Dispersion in Water

The viscosity was determined at 23° C. using a Haake® RS1 rheometer equipped with a rotor of Z20 DIN Ti geometry with a gap of 4.2 mm.

Determination of the Viscosity of the Dispersion (Mixture of the Montmorillonite Dispersion and of the Polymer Dispersion)

The viscosity was determined at 23° C. using a Brookfield® RVD-E viscometer equipped with the Spindle 1 rotor.

The viscosity was measured at a rotational speed of 1 revolution/minute.

Determination of the Viscosity of the Plastisol

The viscosity was determined at 23° C. using a viscometer from Mettler Toledo with an MS108 measuring body.

EXAMPLE 1

According to the Invention 1.1 Montmorillonite Dispersion 6.30 kg of demineralized water were first of all introduced into a receptacle equipped with a stirrer, followed, under gentle stirring, by the gradual introduction of 0.70 kg of IKOMONO NA-F WHITE sodium montmorillonite from Ika. Subsequently, the receptacle was closed using a lid and the mixture was stirred more energetically for 5 minutes. The dispersion of montmorillonite in water obtained was opaque, grey in colour and particularly viscous.

1.2. Polymer Dispersion

Use was made of an aqueous dispersion of vinyl chloride homopolymer obtained by microsuspension polymerization and comprising the following characteristics. The solids content was 47% by weight with respect to the weight of the aqueous dispersion. The K-value was 72. The amount of emulsifier was 12 g of sodium dodecylbenzenesulphonate per kg of polymer in the dry state.

1.3. Blending and Drying 7 kg of montmorillonite dispersion were added, with gentle stirring, to 29.79 kg of polymer dispersion. This blend was subsequently dried by atomization using a Minor P-6.3 dryer from Niro equipped with an FU11 turbine having a diameter of 120 mm under the following conditions. The rotational speed of the turbine was 10 500 rev/min. The temperature of the incoming air was 178° C. The temperature of the exiting air was 78° C. In this way, a composite material was obtained comprising montmorillonite and vinyl chloride homopolymer. The weight-average diameter D50 of the composite material obtained, measured in the way described above, was 38 μm. The average aspect ratio, determined as described above, was 1.25.

1.4. Processing 100 g of composite material obtained in 1.3. was added to 3 g of a heat stabilizer of Ca/Zn type and 6 g of an impact-reinforcing agent of acrylic type. The composition was processed by mixing at 165° C. on a roll mill from Collin equipped with rolls with a diameter of 150 mm. The crepe was pressed in the plaque form by pressing on a 30T hydraulic press from Lafarge at a temperature of 175° C.

EXAMPLE 2

According to the Invention 2.1. Montmorillonite Dispersion

The montmorillonite dispersion was prepared as described in Example 1.

2.2. Polymer Dispersion

Use was made of an aqueous dispersion of vinyl chloride homopolymer obtained by microsuspension polymerization and comprising the following characteristics. The solids content was 44% by weight with respect to the weight of the aqueous dispersion. The K-value was 60. The amount of emulsifier was 12 g of sodium dodecylbenzenesulphonate per kg of polymer in the dry state.

2.3. Blending and Drying 7 kg of montmorillonite dispersion were added, with gentle stirring, to 31.82 kg of polymer dispersion. This blend was subsequently dried by atomization as described in Example 1. In this way, a composite material was obtained comprising montmorillonite and vinyl chloride homopolymer.

2.4. Processing

A composition based on the composite material obtained in 2.3 was prepared as described in Example 1.

EXAMPLE 3

Comparative Example

The preparation was carried out as in Example 1, except that montmorillonite dispersion was not added.

EXAMPLE 4

Comparative Example

The preparation was carried out as in Example 3, except that, when carrying out the mixing, 7 g of montmorillonite were added to the dried polymer.

EXAMPLE 5

Evaluation of the Plaques Obtained in Examples 1 to 4

5.1. Analyses by Optical Microscopy Electron Microscopy and X-Ray Diffraction

Figure 1:
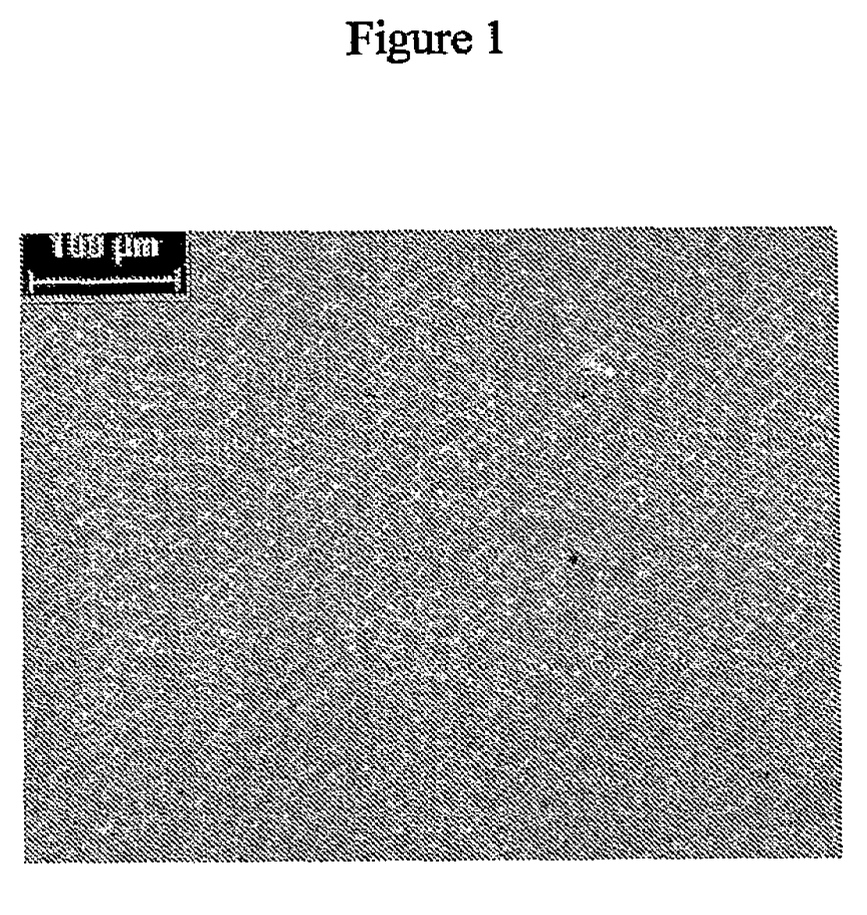
FIG. 1 is an optical micrograph of a plaque in Example 1.
Figure 2:
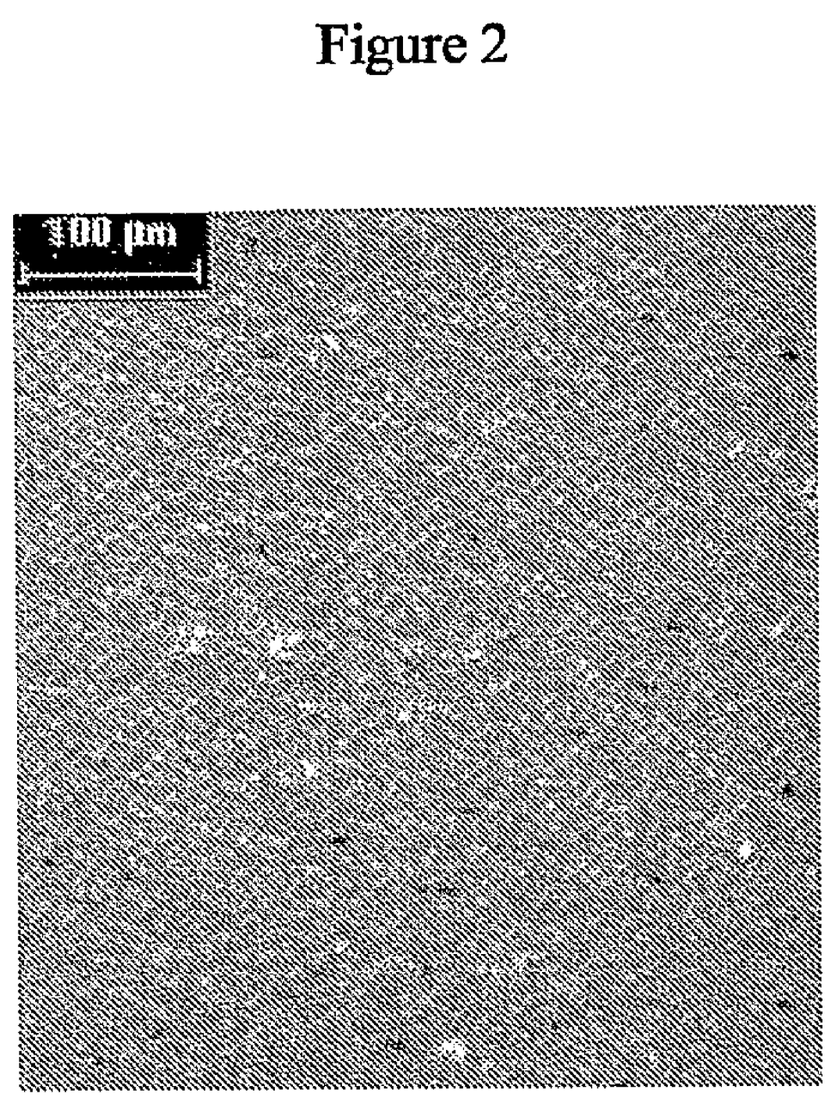
FIG. 2 is an optical micrograph of a plaque in Example 4.

Analyses by optical microscopy were carried out as described above on the plaques of Examples 1 and 4 (FIGS. 1 and 2). These analyses showed that the plaque of Example 1 comprises 21 aggregates with a thickness of greater than or equal to 2 μm over an area of 1 mm$^2$, whereas the plaque of Comparative Example 4 comprises 159 aggregates over the same area.

Figure 3:
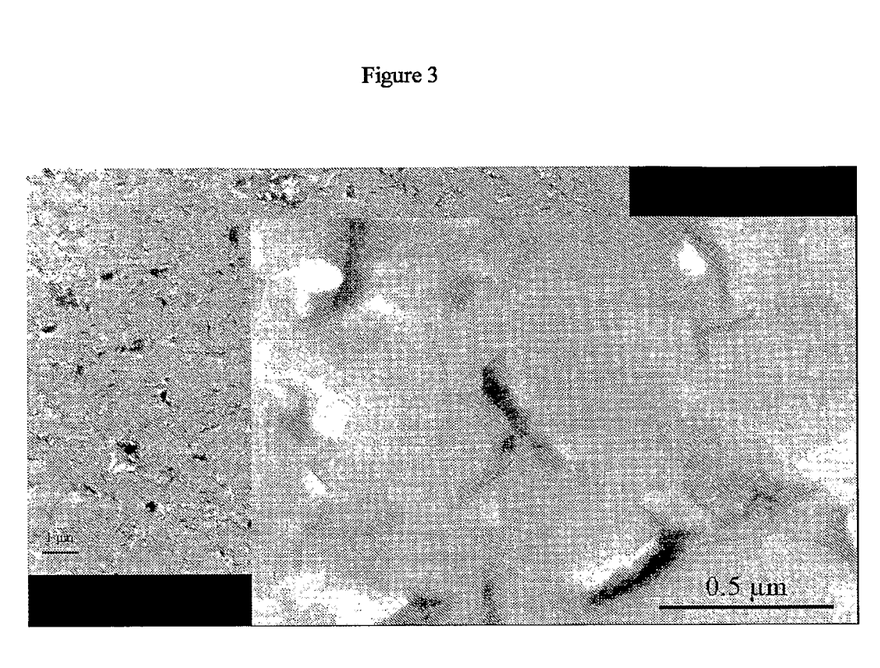
FIG. 3 is a transmission electron micrograph of a plaque in Example 1.

An analysis by transmission electron microscopy on a section was carried out as described above on the plaque of Example 1 (FIG. 3). This analysis shows the presence of numerous isolated montmorillonite platelets and a few thin agglomerates, which suggests that the lamellar filler is largely exfoliated.

An X-ray diffraction analysis was carried out on the plaques of Examples 1 and 4. The diffraction peak characteristic of the starting montmorillonite was not detected for the plaque of Example 1. A diffraction peak with an interplanar distance of 1 nm, corresponding to the starting montmorillonite, was detected for the plaque of Comparative Example 4.

These various analyses suggest that the montmorillonite has been exfoliated in Example 1, whereas the montmorillonite has not been exfoliated in Comparative Example 4.

5.2. Determination of the Stiffness

Figure 4:
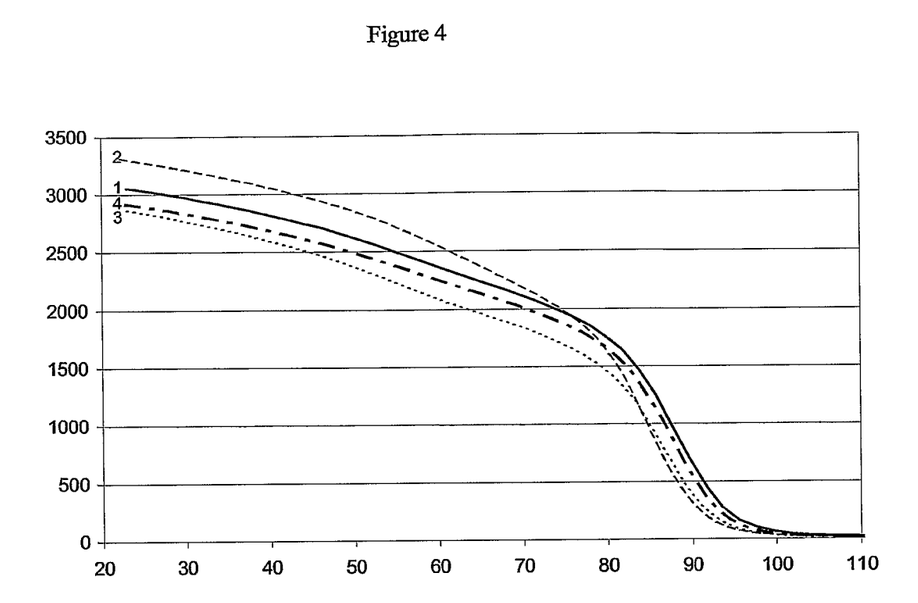
FIG. 4 is the stiffness of the plaques in Example 1-4.

The stiffness and the impact strength of the plaques of Examples 1, 2, 3 and 4 were evaluated as described above. The results have been represented in Table 1. The stiffness has also been represented in FIG. 4, with the storage modulus in MPa on the ordinate and the temperature in degrees Celsius on the abscissa. Curves 1, 2, 3 and 4 correspond to the plaques of Examples 1, 2, 3 and 4. Examination of these curves has shown that the plaques of Examples 1 and 2 have a greater stiffness than the plaques of Comparative Examples 3 and 4. It has been found that the storage modulus and the impact strength of the plaque of Example 2 were higher than for the plaque of Example 1, despite a lower molecular mass of the polymer.

TABLE 1

|       | Temperature (° C.) | Storage modulus (MPa) | Impact strength (J) |
|-------|--------------------|-----------------------|---------------------|
| Ex. 1 | 25                 | 3050                  | 152                 |
|       | 60                 | 2370                  | N.M.                |
|       | 85                 | 1250                  | N.M.                |
| Ex. 2 | 25                 | 3290                  | 275                 |
|       | 60                 | 2550                  | N.M.                |
|       | 85                 | 927                   | N.M.                |
| Ex.3  | 25                 | 2730                  | N.M.                |
|       | 60                 | 2100                  | N.M.                |
|       | 85                 | 1090                  | N.M.                |
| Ex. 4 | 25                 | 2920                  | N.M.                |
|       | 60                 | 2260                  | N.M.                |
|       | 85                 | 1140                  | N.M.                |

N.M. = Not Measured

EXAMPLE 6

According to the Invention 6.1 Montmorillonite Dispersion

The montmorillonite dispersion was prepared as described in Example 1. The dispersion of montmorillonite in water obtained was opaque, grey in colour and particularly viscous. Its viscosity, measured as described above at a gradient of 2 $s^{-1}$.

6.2 Polymer Dispersion

Use was made of an aqueous dispersion of vinyl chloride homopolymer obtained by emulsion polymerization and comprising the following characteristics. The solids content was 41.3% by weight with respect to the aqueous dispersion. The K-value was 70. The amount of emulsifier was 6.3 g of sodium lauryl sulphate and 7.5 g of ammonium myristate per kg of polymer in the dry state.

6.3 Blending and Drying 7 kg montmorillonite dispersion were added, with gentle stirring, to 33.90 of polymer dispersion. The viscosity of the dispersion obtained, measured as described above, was 7.26 Pa·s. This dispersion was subsequently dried by atomization using a Minor P-6.3 dryer from Niro equipped with an FU11 turbine having a diameter of 120 mm under the following conditions. The rotational speed of the turbine was 10 500 rev/min. The temperature of the incoming air was 190° C. The temperature of the exiting air was 73° C. In this way, a composite material was obtained comprising montmorillonite and vinyl chloride homopolymer.

6.4. Processing

A plastisol was prepared by blending 100 g of the composite material prepared in 6.3. and 150 g of diisononyl phthalate plasticizer using a Dispermat® mixer from VMA-Getzmann GmbH Verfahrenstechnik under the following conditions. The rotational speed was 2000 rev/min. The temperature was 23° C. The blending time was 5 minutes. After degassing under vacuum the oxygen present in the blend, the plastisol was left to stand for 2 hours.

EXAMPLE 7

Comparative Example

The preparation was carried out as in Example 6, except that montmorillonite dispersion was not added.

EXAMPLE 8

Evaluation of the Plastisols Prepared in Examples 6 and 7

Figure 5:
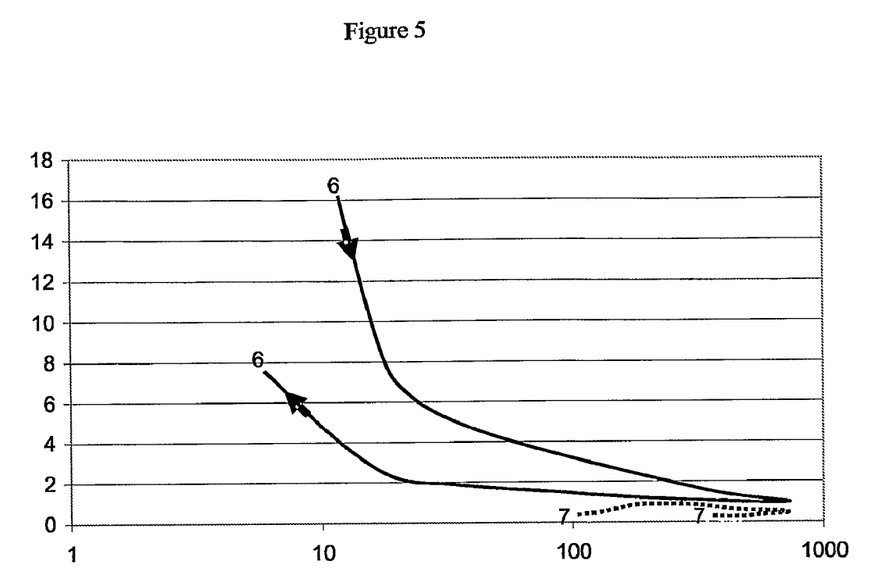
FIG. 5 is the viscosity of the plastisols of Examples 6 and 7.

The viscosity of the plastisols of Examples 6 and 7 was evaluated as described above. A measurement cycle was performed as a shear rate from 5 to 700 $s^{-1}$ and then from 700 to 5 $s^{-1}$. The evaluation has been represented in FIG. 5 with the viscosity in Pas on the ordinate and the shear rate in $s^{-1}$ on the abscissa. Curves 6 and 7 correspond to the plastisols of Examples 6 and 7. The examination of these curves has shown that the viscosity of the plastisol of Example 6 is higher than the viscosity of that of Example 7. Furthermore, the plastisol of Example 6 exhibits a pseudoplastic behaviour, characterized by an increase in the viscosity at low shear rate, both while increasing the shear rate and while reducing it.

EXAMPLES 9 TO 11

Comparative Examples

The montmorillonite dispersion and the polymer dispersion were prepared as described in Example 1.

Blending and Coagulation 70 g of montmorillonite dispersion were added, with gentle stirring, to 298 g of polymer dispersion. This blend was subsequently coagulated by addition of an aqueous magnesium sulphate solution (0.1N). This operation led to the blend setting solid around the stirrer (Example 9). A second coagulation test (Example 10) was carried out under the same conditions but with energetic stirring. It led to the same result. A third test (Example 11) was carried out using an aqueous calcium chloride solution. It led to the same result. The products from these coagulations were not evaluated further as their morphology rendered the handling and the drying particularly difficult.

EXAMPLE 12

According to the Invention 12.1. Dispersion of the Clay Laponite® RDS 6.3 kg of demineralized water were first of all introduced into a receptacle equipped with a stirrer, followed, under gentle stirring, by the gradual introduction of 0.70 kg of the synthetic clay Laponite® RDS from Rockwood. This clay comprises tetrasodium pyrophosphate in a proportion of 8.24% by weight of anhydrous tetrasodium pyrophosphate with respect to the weight of the clay in the dry state. Subsequently, the receptacle was closed using a lid and the mixture was stirred more energetically for 5 minutes. The dispersion of the Laponite® clay in water obtained was transparent and not very viscous.

12.2. Polymer Dispersion

The aqueous polymer dispersion was prepared as described in Example 6.

12.3. Blending and Drying 7 kg of dispersion of the Laponite® clay were added, with gentle stirring, to 33.90 kg of polymer dispersion. This blend was subsequently dried by atomization using a Minor P-6.3 dryer from Niro equipped with an FU11 turbine having a diameter of 120 mm under the following conditions. The rotational speed of the turbine was 10 500 rev/min. The temperature of the incoming air was 190° C. The temperature of the exiting air was 73° C. In this way, a composite material was obtained comprising Laponite® clay and vinyl chloride homopolymer.

12.4. Processing

A plastisol was prepared by blending 100 g of the composite material prepared in 12.3. and 150 g of diisononyl phthalate plasticizer using a Dispermat® mixer from VMA-Getzmann GmbH Verfahrenstechnik under the following conditions. The rotational speed was 2000 rev/min. The temperature was 23° C. The blending time was 5 minutes. After degassing under vacuum the oxygen present in the blend, the plastisol was left to stand for 2 hours.

EXAMPLE 13

According to the Invention 13.1. Montmorillonite Dispersion with the Addition of Tetrasodium Pyrophosphate 4 g of anhydrous tetrasodium pyrophosphate powder per kg of IKOMONT NA-F WHITE sodium montmorillonite powder were first of all mixed in a beaker using a glass rod. 6.3 kg of demineralized water were first of all introduced into a receptacle equipped with a stirrer and then 70.3 g of the montmorillonite/pyrophosphate mixture were gradually introduced with gentle stirring. Subsequently, the receptacle was closed using a lid and the mixture was stirred more energetically for 5 minutes.

The dispersion of montmorillonite in water obtained was opaque, grey in colour and not very viscous. Its viscosity, measured as described above at a gradient of $2\ s^{-1}$, was 9.2 Pa·s, that is to say markedly lower than in the case of Example 6.

13.2. Polymer Dispersion

The aqueous polymer dispersion was prepared as described in Example 6.

13.3. Blending and Drying 7 kg of montmorillonite dispersion were added, with gentle stirring, to 33.90 kg of polymer dispersion. The viscosity of the dispersion obtained, measured as described above, was 0.41 Pa·s; that is to say substantially lower than in the case of Example 6. The dispersion was subsequently dried by atomization using a Minor P-6.3 dryer from Niro equipped with an FU11 turbine having a diameter of 120 mm under the following conditions. The rotational speed of the turbine was 10 500 rev/min. The temperature of the incoming air was 190° C. The temperature of the exiting air was 73° C. In this way, a composite material was obtained comprising montmorillonite and vinyl chloride homopolymer.

13.4. Processing

A plastisol was prepared by blending 100 g of the composite material prepared in 13.3. and 150 g of diisononyl phthalate plasticizer using a Dispermat® mixer from VMA-Getzmann GmbH Verfahrenstechnik under the following conditions. The rotational speed was 2000 rev/min. The temperature was 23° C. The blending time was 5 minutes. After degassing under vacuum the oxygen present in the blend, the plastisol was left to stand for 2 hours.

EXAMPLE 14

Evaluation of the Plastisols Prepared in Examples 12 and 13

Figure 6:
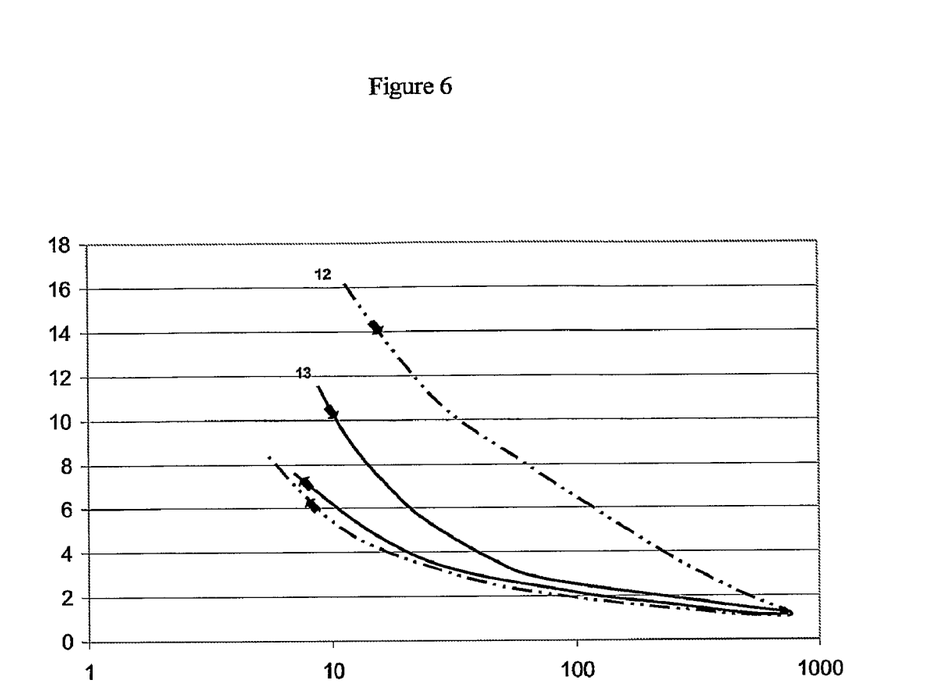
FIG. 6 is the viscosity of the plastisols of Examples 12 and 13.

The viscosity of the plastisols of Examples 12 and 13 was evaluated as described above. A measurement cycle was performed as shear rate from 5 to 700 $s^{-1}$ and then from 700 to 5 $s^{-1}$. The evaluation has been represented in FIG. 6 with the viscosity in Pa·s on the ordinate and the shear rate in $s^{-1}$ on the abscissa. Curves 12 and 13 correspond to the plastisols of Examples 12 and 13. The examination of these curves has shown that the viscosity of the plastisols of Example 12 and of Example 13 is similar to that of the plastisol of Example 6. It may also be observed that, although the viscosity of the dispersion before drying of Example 13 was substantially lower than the viscosity of that of Example 6, the viscosity of the plastisol obtained is similar. Furthermore, the plastisol of Examples 12 and 13, just like that of Example 6, exhibits a pseudoplastic behaviour characterized by an increase in the viscosity at low shear rate, both while increasing the shear rate and while reducing it.

The invention claimed is:

1. A process for the manufacture of a composite material comprising drying a dispersion comprising:
    (a) at least one polymer,
    (b) at least one lamellar compound, and
    (c) at least one dispersing liquid, by atomization.

2. The process according to claim 1, wherein the polymer is a halogenated polymer.

3. The process according to claim 2, wherein the halogenated polymer is obtained by a polymerization process chosen from aqueous microsuspension polymerization and aqueous emulsion polymerization.

4. The process according to claim 1, wherein the dispersion comprises a lamellar compound is chosen from smectites and synthetic layered silicate clays.

5. The process according to claim 1, wherein the dispersion additionally comprises at least one surface-active agent.

6. The process according to claim 1, wherein the dispersion is prepared by blending a first dispersion comprising (a), a portion of (c) and, optionally, a surface-active agent with a second dispersion comprising (b) and the balance of (c).

7. The process according to claim 1, wherein the dispersion additionally comprises at least one peptizing agent.

8. The process according to claim 1, further comprising treating the composite material to adjust the morphology thereof.

9. The process according to claim 1, wherein said drying is carried out with compressed air.

10. The process according to claim 9, wherein the temperature of incoming air used for the drying is greater than or equal to 140° C. and less than or equal to 210° C. and wherein the temperature of air exiting from the drying is greater than or equal to 55° C. and less than or equal to 90° C.

11. The process according to claim 1, wherein said at least one polymer comprises a polymer selected from the group consisting of fluoropolymers, chloropolymers, and mixtures thereof.

12. The process according to claim 11, wherein said at least one polymer comprises a vinylidene fluoride polymer.

13. The process according to claim 11, wherein said at least one polymer comprises a vinyl chloride polymer.

14. The process according to claim 1, wherein said drying is turbine atomization.

15. The process according to claim 1, wherein said drying is atomization with compressed air through two-fluid nozzles.

16. The process according to claim 1, wherein said drying is atomization by compression-pressure reduction using nozzles with a fluid.

17. The process according to claim 1, wherein said dispersion comprises:
 (a) between 8 and 70% of said at least one polymer selected from the group consisting of a vinylidene fluoride polymer, a vinyl chloride polymer, and mixtures thereof, expressed as % by weight of polymer with respect to the weight of the dispersion,
 (b) 0.001 to 20% of said at least one lamellar compound, expressed as % by weight of lamellar compound in the dry state with respect to the weight of polymer in the dry state, and
 (c) between 30 and 90% of said at least one dispersing liquid, expressed as % by weight of dispersing liquid with respect to the weight of the dispersion.

18. The process according to claim 1, wherein said dispersion comprises:
 (a) between 8 and 70% of said at least one polymer selected from the group consisting of a vinylidene fluoride polymer, a vinyl chloride polymer, and mixtures thereof, expressed as % by weight of polymer with respect to the weight of the dispersion,
 (b) 0.01 and 10% of said at least one lamellar compound, expressed as % by weight of lamellar compound in the dry state with respect to the weight of polymer in the dry state, and
 (c) between 40 and 80% of said at least one dispersing liquid, expressed as % by weight of dispersing liquid with respect to the weight of the dispersion.

19. The process according to claim 1, further comprising, after drying, forming a plastisol.

20. The process according to claim 1, further comprising, after drying, bringing the polymer to a temperature greater than or equal to its melting point or gelling temperature.

* * * * *